(12) United States Patent
Lee

(10) Patent No.: US 6,182,979 B1
(45) Date of Patent: Feb. 6, 2001

(54) SUSPENSION SYSTEM FOR VEHICLES

(75) Inventor: Un-Koo Lee, Kyungki-do (KR)

(73) Assignee: Hyundai Motor Company, Seoul (KR)

( * ) Notice: Under 35 U.S.C. 154(b), the term of this patent shall be extended for 0 days.

(21) Appl. No.: 09/223,844

(22) Filed: Dec. 31, 1998

(30) Foreign Application Priority Data

Dec. 31, 1997 (KR) .................................................. 97-80121

(51) Int. Cl.⁷ ...................................................... B62B 5/02
(52) U.S. Cl. ..................................... 280/5.507; 280/5.506
(58) Field of Search ........................... 280/5.506, 5.507, 280/5.508, 5.52, 124.125, 124.135, 124.136, 43.51

(56) References Cited

U.S. PATENT DOCUMENTS

| | | | |
|---|---|---|---|
| 2,071,577 | * 2/1937 | Renwick | 267/19 |
| 4,168,075 | * 9/1979 | Matschinsky | 280/6.12 |
| 5,230,529 | * 7/1993 | Harvey-Bailey | 280/707 |
| 5,700,025 | * 12/1997 | Lee | 280/661 |
| 5,938,219 | * 8/1999 | Hayami et al. | 280/124.135 |
| 5,992,866 | * 11/1999 | Frigo et al. | 280/124.133 |
| 6,036,201 | * 3/2000 | Pond et al. | 280/5.514 |

* cited by examiner

*Primary Examiner*—Kevin Hurley
*Assistant Examiner*—Kevin McKinley
(74) *Attorney, Agent, or Firm*—Christie, Parker & Hale, LLP

(57) ABSTRACT

A suspension system for a vehicle includes a wheel carrier for rotatably supporting a wheel, an upper control link having a first end coupled to an upper end of the wheel carrier and a second end proximal to a vehicle body, a lower control link having a second end coupled to a lower end of the wheel carrier and a second end proximal to the vehicle body, a reciprocating hydraulic actuator disposed such that its reciprocating motion becomes perpendicular to a vertical direction of the vehicle body, a converter for converting the reciprocating motion of the reciprocating hydraulic actuator into an up-and-own motion of the upper and lower control links, and an electronic control part for controlling an operation of the reciprocating hydraulic actuator in accordance with a driving condition of the vehicle.

11 Claims, 4 Drawing Sheets

SUSPENSION SYSTEM FOR VEHICLES

CROSS-REFERENCE TO RELATED APPLICATIONS

This application claims priority of Korean Patent Application No. 97-80121 filed on Dec. 31, 1997, the disclosure of which is incorporated herein by reference.

BACKGROUND OF THE INVENTION (a) Field of the Invention

The present invention relates to a suspension system for a vehicle and, more particularly, to an active suspension system for a vehicle which assumes an optimal geometrical shape depending on the driving state.

(b) Description of the Related Art

Generally, conventional active control suspension systems are designed to control the roll and pitch of a vehicle body by detecting the same and forcing the vehicle body against the directions of the roll and pitch. To apply such force to the vehicle body, the suspension system requires the use of a high level of energy.

That is, when using hydraulic force, the mechanical energy W of a hydraulic actuator can be calculated using an equation as shown in the following:

$$W = F \cdot S = |F||S|\cos\theta$$

where, F is the actuator force, S is an actuator stroke, and θ is an actuating angle of the actuator with respect to a vertical direction of the vehicle.

In a conventional active suspension system, as is well known, since the hydraulic actuator is disposed in a vertical direction with respect to the vehicle body, a great amount of mechanical energy needs to be exerted by the actuator to support the vehicle body. Even when the actuator is not mechanically operating in a state where no roll and pitch is applied to the vehicle, mechanical energy for supporting the vehicle against outer force is required.

Therefore, to apply such a great amount of mechanical energy, a high capacity hydraulic pump, a highly precise actuator, and various valves are required, complicating the suspension system, enlarging the size of the same as well as increasing manufacturing costs.

SUMMARY OF THE INVENTION

Therefore, the present invention has been made in an effort to solve the above-described problems.

It is an objective of the present invention to provide a suspension system for a vehicle which is simple in structure and can effectively control the height of a roll center, in addition to a camber and a tread using minimized energy, thereby providing optimal driving conditions for the vehicle.

To achieve the above objective, the present invention provides a suspension system for a vehicle. The suspension system comprises a wheel carrier for rotatably supporting a wheel, an upper control link having a first end coupled to an upper end of the wheel carrier and a second end proximal to a vehicle body, a lower control link having a second end coupled to a lower end of the wheel carrier and a second end proximal to the vehicle body, a reciprocating hydraulic actuator disposed such that its reciprocating motion becomes perpendicular to a vertical direction of the vehicle body, a converter for converting the reciprocating motion of the reciprocating hydraulic actuator into an up-and-down motion of the upper and lower control links, and an electronic control part for controlling an operation of the reciprocating hydraulic actuator in accordance with a driving condition of the vehicle.

According to an embodiment of the present invention, the means for converting comprises an upper bell crank comprising a hinge portion pivotally coupled on an upper stationary hinge shaft supported by an upper bracket fixedly mounted on a vehicle body, a horizontal portion extending from the hinge portion toward the wheel carrier and to which the second end of the upper control link is pivotally coupled, and a vertical portion extending downward from the hinge portion, a lower bell crank comprising a hinge portion pivotally coupled on a upper stationary hinge shaft supported by the lower bracket, a horizontal portion extending from the hinge portion toward the wheel carrier and to which the second end of the lower control link is pivotally coupled, and a vertical portion extending upward from the hinge portion; and a lower end of the vertical portions of the upper bell crank and an upper end of the vertical portion of the lower bell crank being pivotally mounted on a movable hinge shaft to which actuating force of the actuator is applied.

Preferably, each length of the vertical portions of the upper and lower bell cranks is longer than that of the horizontal portions of the upper and lower bell cranks.

BRIEF DESCRIPTION OF THE DRAWINGS

The accompanying drawings, which are incorporated in and constitute a part of the specification, illustrate an embodiment of the present invention, and, together with the description, serve to explain the principles of the invention.

DETAILED DESCRIPTION OF THE PREFERRED EMBODIMENTS

Reference will now be made in detail to the presently preferred embodiment of the invention, an example of which is illustrated in the accompanying drawings. Wherever possible, the same reference numbers will be used throughout the drawings to refer to the same or like parts.

Figure 1:
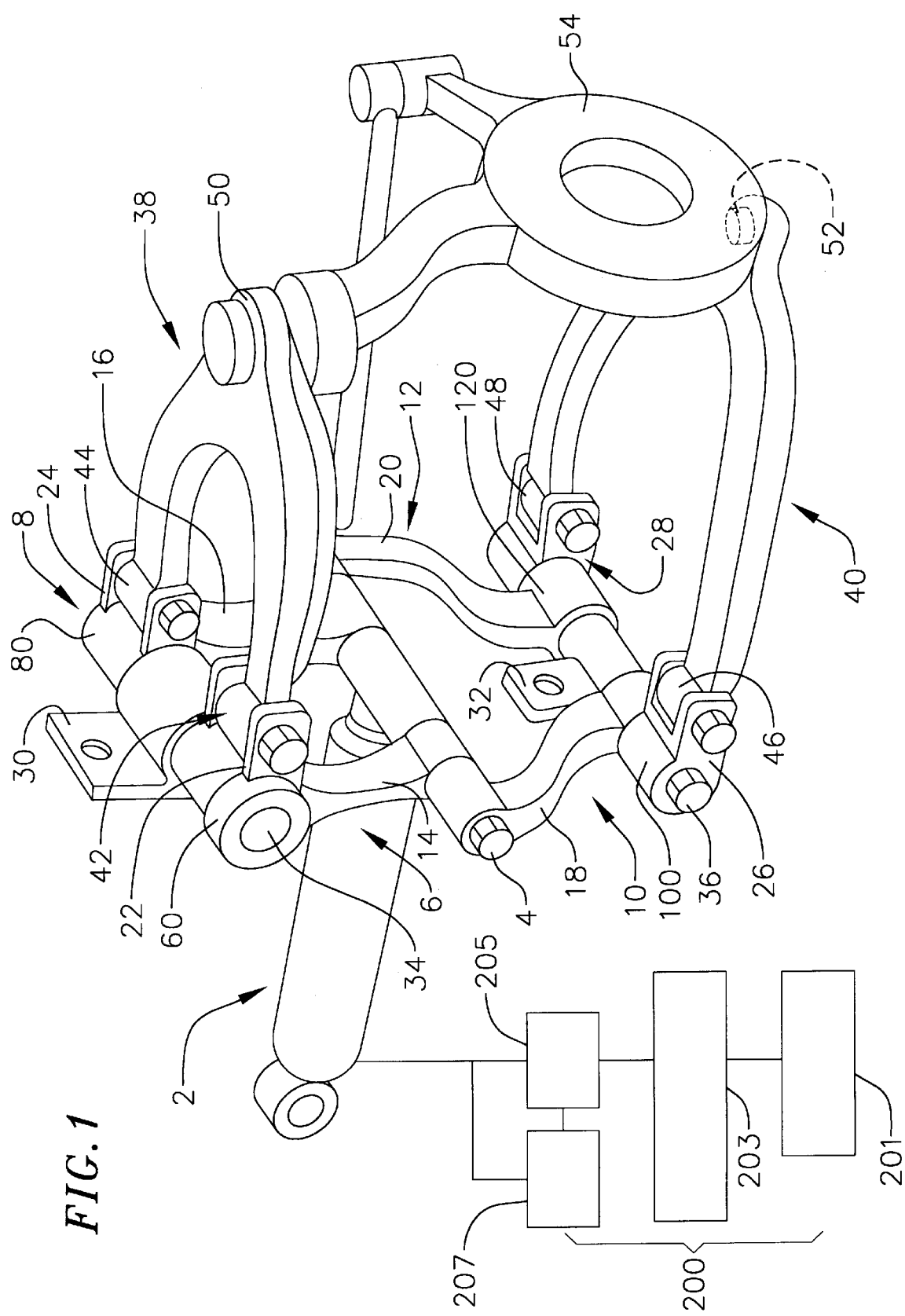
FIG. 1 is a perspective view illustrating a suspension system according to a preferred embodiment of the present invention.

Referring first to FIG. 1, there is shown a suspension system according to a preferred embodiment of the present invention.

The inventive suspension system comprises a wheel carrier 54 for rotatably supporting a wheel (not shown); an upper control link 38 having a first end 50 coupled to an upper end of the wheel carrier 54 by, for example, a ball joint assembly or a bushing assembly and two second ends 42 and 44 branched off from the first end 50 and extending toward a vehicle body (not shown); and a lower control link 40 having a first end 52 coupled to a lower end of the wheel carrier 54 by, for example, a ball joint assembly or a bushing assembly and two second ends 46 and 48 branched off from the first end 52 and extending toward the vehicle body.

The two second ends 42 and 44 of the upper control link 38 are respectively connected to first and second upper bell cranks 6 and 8 which are connected to the vehicle body by an upper bracket 30.

The first upper bell crank 6 comprises a hinge portion 60 pivotally coupled on an upper stationary hinge shaft 34 supported by the upper bracket 30 mounted on the vehicle body, a horizontal portion 22 extending from the hinge portion 60 toward the wheel carrier 54 and to which the second end 42 of the upper control link 38 is pivotally coupled by a bushing assembly, and a vertical portion 14 extending downward from the hinge portion 60. The second upper bell crank 8 comprises a hinge portion 80 pivotally coupled on the upper stationary hinge shaft 34 mounted on the vehicle body, a horizontal portion 24 extending from the hinge portion 60 toward the wheel carrier 54 and to which another second end 44 of the upper control link 38 is pivotally coupled, and a vertical portion 16 extending downward from the hinge portion 80.

In addition, the two second ends 46 and 48 of the lower control link 40 are respectively connected to first and second lower bell cranks 10 and 12 disposed under the first and second upper bell cranks 6 and 8 and connected to the vehicle body by a lower bracket 32 mounted on the vehicle body.

The first lower bell crank 10 comprises a hinge portion 100 pivotally coupled on a lower stationary hinge shaft 36 supported by the lower bracket 32, a horizontal portion 26 extending from the hinge portion 100 toward the wheel carrier 54 and to which the second end 46 of the lower control link 40 is pivotally coupled, and a vertical portion 18 extending upward from the hinge portion 100. The second lower bell crank 12 comprises a hinge portion 120 pivotally coupled on the lower stationary hinge shaft 36, a horizontal portion 28 extending from the hinge portion 120 toward the wheel carrier 54 and to which another second end 48 of the lower control link 40 is pivotally coupled, and a vertical portion 20 extending upward from the hinge portion 120.

The lower ends of the vertical portions 14 and 16 of the first and second upper bell cranks 6 and 8 and the upper ends of the vertical portions 18 and 20 of the first and second lower bell cranks 10 and 12 are pivotally coupled on a middle movable hinge shaft 4.

In addition, a hydraulic actuator 2 such as a reciprocating cylinder is horizontally disposed and pivotally coupled at its one end to the middle movable shaft 4 and at its the other end to the vehicle body.

In the above, each of the bell cranks 6, 8, 10 and 12 is designed such that each length of the vertical portions 14, 16, 18 and 20 is longer than that of the horizontal portions 22, 24, 26 and 28 so that the hydraulic actuator 2 can easily move the upper and lower control links 38 and 40 upward and downward.

The hydraulic actuator 2 is controlled by a hydraulic control part 200 in accordance with driving conditions of a vehicle.

The hydraulic control part 200 comprises a sensor part 201 consisting of, for example, a vehicle speed sensor, a steering angle sensor, and a lateral sensor; a control part 203 receiving signals on the driving conditions of the vehicle from the sensor part 201; and a fluid pump 205 for feeding fluid from a fluid tank 207 to the hydraulic actuator 2, the operation of the fluid pump 205 being controlled by the control part 203 in accordance with the signals transmitted from the sensor part 201.

Now the operation of the above described suspension system will be described hereinafter with reference to FIGS. 2 and 3.

Figure 2:
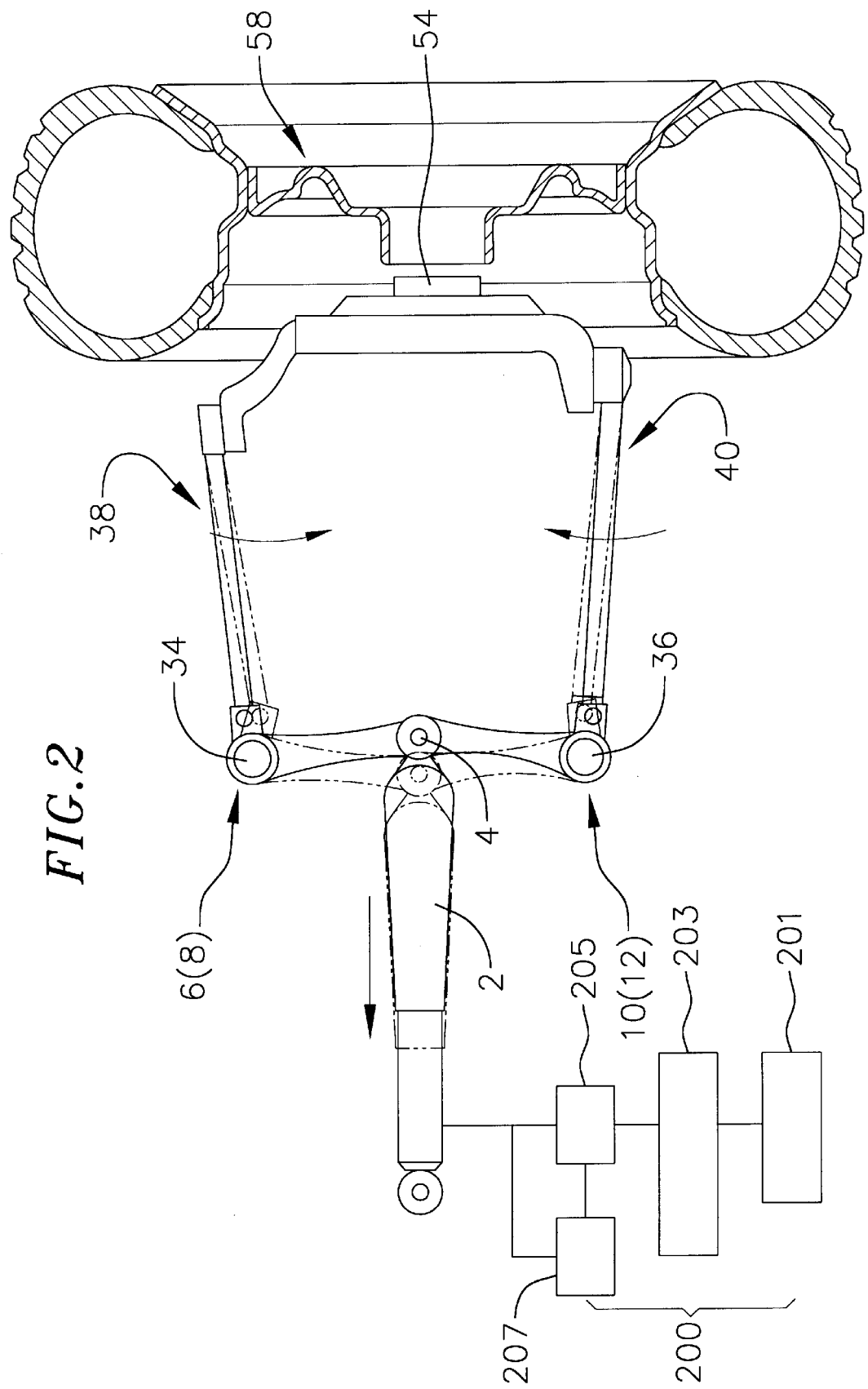
FIG. 2 is a front view of the suspension system depicted in FIG. 1 illustrating the operation of the same when a roll center ascends.

Referring first to FIG. 2, when the control part 203 determines from the signals received from the sensor part 201 that the roll center requires raising, the control part 203 controls the hydraulic pump 205 such that the hydraulic actuator 2 pulls the movable hinge shaft 4 toward the vehicle body, whereby the upper bell cranks 6 and 8 rotate clockwise while the lower bell cranks 10 and 12 rotate counterclockwise. As a result, the second ends 42 and 44 of the upper control link 38 coupled to the upper bell cranks 6 and 8 descend while the second ends 46 and 48 of the lower control link 38 coupled to the lower bell cranks 10 and 12 ascend. This results in raising the roll center.

Figure 3:
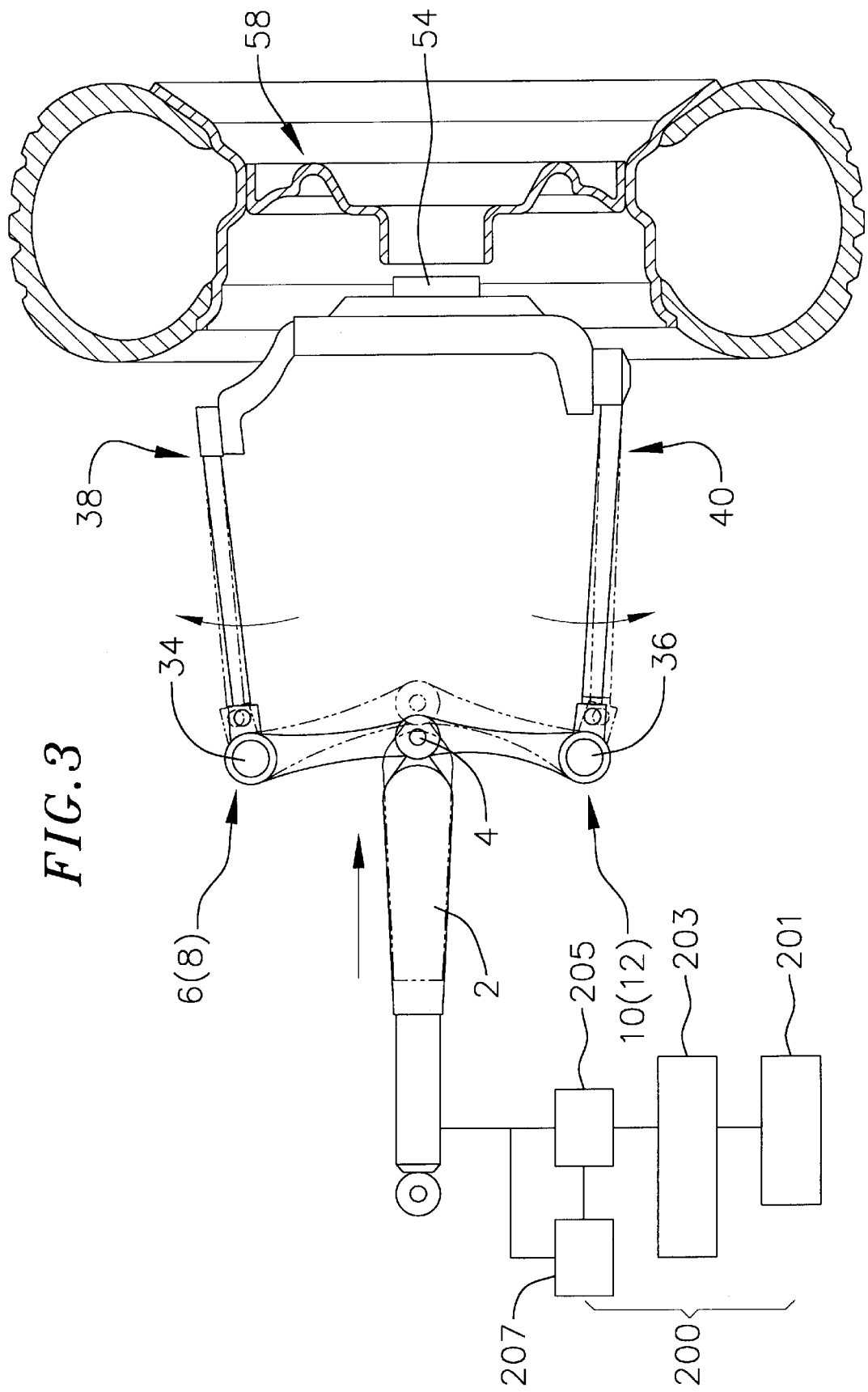
FIG. 3 is a front view of the suspension system depicted in Fig, 1 illustrating the operation of the same when a roll center descends.

In addition, with reference to FIG. 3, when a signal for lowering the roll center is transmitted from the sensor part 201 to the control part 203, the control part 203 controls the hydraulic pump 205 such that the hydraulic actuator 2 pushes the movable hinge shaft 4 toward the wheel 58, whereby the upper bell cranks 6 and 8 rotate counterclockwise while the lower bell cranks 10 and 12 rotate clockwise. As a result, the second ends 42 and 44 of the upper control link 38 coupled to the upper bell cranks 6 and 8 ascend while the second ends 46 and 48 of the lower control link 38 coupled to the lower bell cranks 10 and 12 descend. This results in lowering the roll center.

Figure 4:
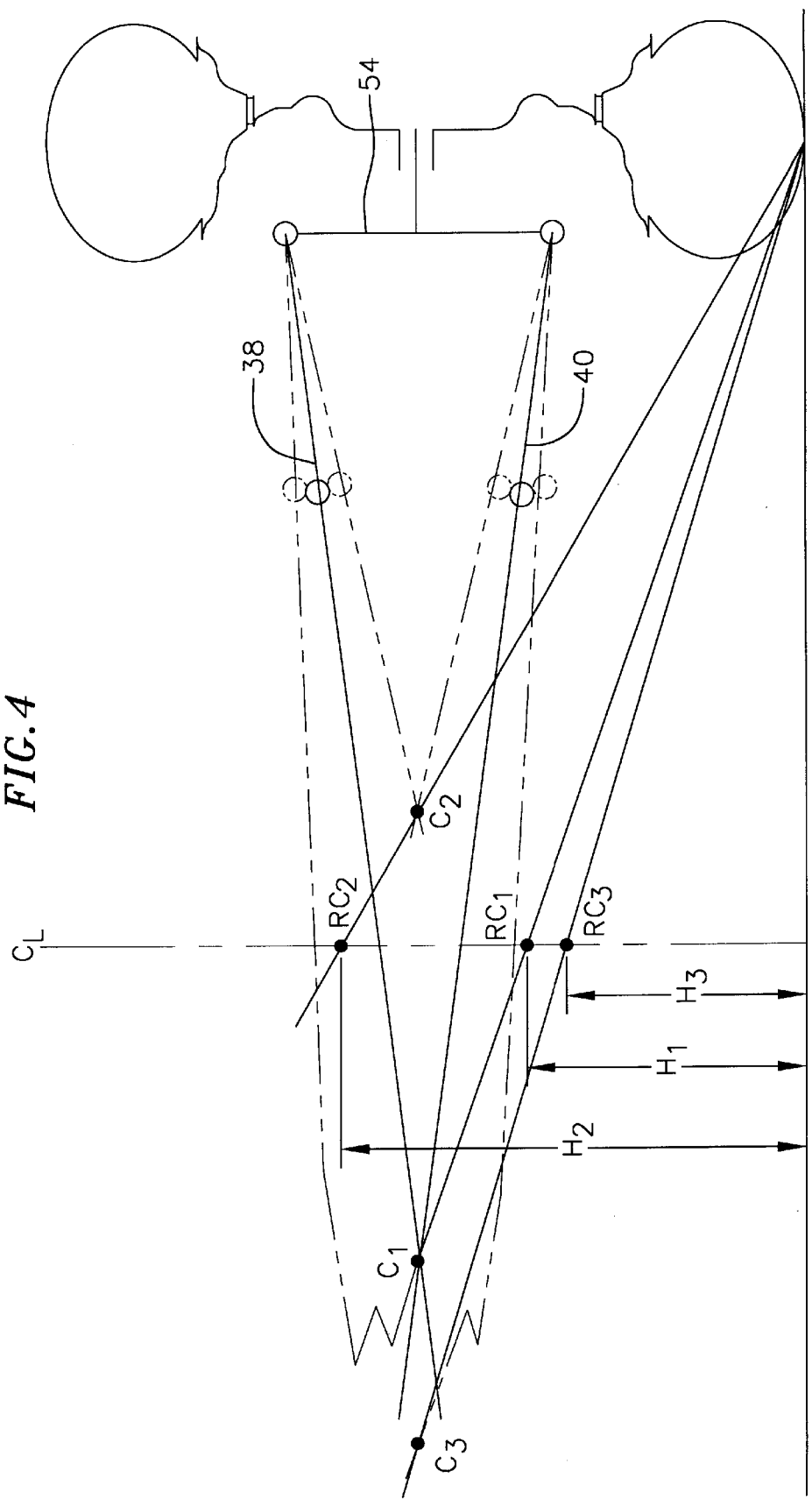
FIG. 4 is a schematic view illustrating variations in a roll center achieved by the operation of a suspension system in accordance with a preferred embodiment of the present invention.

FIG. 4 shows a schematic view illustrating variations in the roll center induced by the operation of the inventive suspension system.

In a normal driving state, an instantaneous center C1 of a wheel 58 with respect to the vehicle body is formed at an intersection of a line extending from the upper control link 38 and a line extending from the lower control link 40.

At this point, a roll center RC1 is formed at an intersection of a line connecting a contact point of the wheel 58 with a road surface to the instantaneous center C1 and a center line CL of the vehicle body. A distance from the road surface to the roll center RC1 becomes a height H1 of the roll center RC1.

Therefore, the rolling of the vehicle occurs on the basis of the roll center RC1 unless the roll center is varied.

In the above state, if the upper and lower control links 38 and 40 are controlled as shown in FIG. 2, that is, if a distance between the second ends 42 and 44 of the upper control link 38 and the second ends 46 and 48 of the lower control link 40 is lessened, an instantaneous center C2 of the wheel 58 with respect to the vehicle body is formed at an intersection of a line extending from the upper control link 38 and a line extending from the lower control link 40.

At this point, a roll center RC2 is formed at an intersection of a line connecting the contact point of the wheel 58 with the road surface to the instantaneous center C2 and the center line CL of the vehicle body. Therefore, a distance from the road surface to the roll center RC2 becomes a height H2 of the roll center RC2.

In addition, if the upper and lower control links 38 and 40 are controlled as shown in FIG. 3, and if a distance between the second ends 42 and 44 of the upper control link 38 and the second ends 46 and 48 of the lower control link 40 is increased, an instantaneous center C3 of the wheel 58 with respect to the vehicle body is formed at an intersection of a line extending from the upper control link 38 and a line extending from the lower control link 40.

At this point, a roll center RC3 is formed at an intersection of a line connecting the contact point of the wheel 58 with the road surface to the instantaneous center C3 and the center line CL of the vehicle body. Therefore, a distance from the road surface to the roll center RC3 becomes a height H3 of the roll center RC3, lowering the height of the roll center RC3.

As described above, the suspension system according to the present invention suppresses the roll of the vehicle by adjusting the height of the roll center in accordance with road conditions.

In addition, since the actuator 2 is horizontally disposed such that its reciprocating motion becomes perpendicular to a vertical direction of the vehicle body, the mechanical energy required to be exerted by the actuator 2 is minimized when considering the following equation:

$$W = F \cdot S = |F||S|\cos\theta$$

where, F is the actuator force, S is an actuator stroke, and $\theta$ is an actuating angle of the actuator with respect to a vertical direction of the vehicle.

Therefore, there is no need for a high capacity hydraulic pump for operating the actuator of the inventive suspension system, thereby reducing the weight of the vehicle and decreasing the costs for manufacturing the suspension system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A suspension system for a vehicle, comprising:
   a wheel carrier for rotatably supporting a wheel;
   an upper control link, a first end of which is connected to an upper end of the wheel carrier and a second end of which is mountable in proximity to a vehicle body;
   a lower control link, a first end of which is connected to a lower end of the wheel carrier and a second end of which is mountable in proximity to the vehicle body; and
   a roll controller having a reciprocating hydraulic actuator horizontally disposed to actuate, in a lateral direction of the vehicle, the upper and lower control links simultaneously.

2. The suspension system of claim 1 wherein the roll controller further comprises:
   means for converting a reciprocating motion into an up-and-down motion of the second ends of the upper and lower control links; and
   a hydraulic controller for controlling the reciprocating motion of the reciprocating hydraulic actuator.

3. The suspension system of claim 1 wherein the means for converting comprises:
   an upper bell crank comprising a hinge portion pivotally coupled on an upper stationary hinge shaft supported by an upper bracket fixedly mounted on a vehicle body, a horizontal portion extending from the hinge portion toward the wheel carrier and to which the second end of the upper control link is pivotally coupled, and a vertical portion extending downward from the hinge portion;
   a lower bell crank comprises a hinge portion pivotally coupled on a upper stationary hinge shaft supported by the lower bracket, a horizontal portion extending from the hinge portion toward the wheel carrier and to which the second end of the lower control link is pivotally coupled, and a vertical portion extending upward from the hinge portion; and
   a lower end of the vertical portions of the upper bell crank and an upper end of the vertical portion of the lower bell crank being pivotally mounted on a movable hinge shaft to which actuating force of the actuator is applied.

4. The suspension system of claim 2 wherein the means for converting comprises:
   an upper bell crank comprising a hinge portion pivotally coupled on an upper stationary hinge shaft supported by an upper bracket fixedly mounted on a vehicle body, a horizontal portion extending from the hinge portion toward the wheel carrier and to which the second end of the upper control link is pivotally coupled, and a vertical portion extending downward from the hinge portion; and
   a lower bell crank comprising a hinge portion pivotally coupled on an upper stationary hinge shaft supported by the lower bracket, a horizontal portion extending from the hinge portion toward the wheel carrier and to which the second end of the lower control link is pivotally coupled, and a vertical portion extending upward from the hinge portion;
   wherein a lower end of the vertical portion of the upper bell crank and an upper end of the vertical portion of the lower bell crank is pivotally mounted on a movable hinge shaft to which actuating force of the actuator is applied.

5. The suspension system of claim 4 wherein each length of the vertical portions of the upper and lower bell cranks is greater than each length of the horizontal portions of the upper and lower bell cranks.

6. The suspension system of claim 3 wherein each length of the vertical portions of the upper and lower bell cranks is greater than each length of the horizontal portions of the upper and lower bell cranks.

7. A suspensions system for a vehicle comprising:
   a wheel carrier for rotatably supporting a wheel;
   an upper control link having a first end coupled to an upper end of the wheel carrier and a second end mountable in proximity to a vehicle body;
   a lower control link having a first end coupled to a lower end of the wheel carrier and a second end mountable in proximity to the vehicle body;
   a reciprocating hydraulic actuator disposed such that its reciprocating motion becomes perpendicular to a vertical direction of the vehicle body, wherein the actuator actuates the upper and lower control links simultaneously;
   means for converting the reciprocating motion of the reciprocating hydraulic actuator into an up-and-down motion of the upper an lower control links; and
   an electronic control part for controlling an operation of the reciprocating hydraulic actuator in accordance with the driving conditions of the vehicle.

8. A suspension system for a vehicle, comprising:
   a wheel carrier for rotatably supporting a wheel;
   an upper control link, a first end of which is connected to an upper end of the wheel carrier and a second end of which is mountable in proximity to a vehicle body;
   a lower control link, a first end of which is connected to a lower end of the wheel carrier and a second end of which is mountable in proximity to the vehicle body;
   a reciprocating hydraulic actuator horizontally disposed to actuate in a lateral direction of the vehicle;
   a hydraulic controller for controlling the reciprocating motion of the reciprocating hydraulic actuator;

an upper bell crank comprising a hinge portion pivotally coupled on an upper stationary hinge shaft supported by an upper bracket fixedly mounted on a vehicle body, a horizontal portion extending from the hinge portion toward the wheel carrier and to which the second end of the upper control link is pivotally coupled, and a vertical portion extending downward from the hinge portion; and a lower bell crank comprising a hinge portion pivotally coupled on an upper stationary hinge shaft supported by the lower bracket, a horizontal portion extending from the hinge portion toward the wheel carrier and to which the second end of the lower control link is pivotally coupled, and a vertical portion extending upward from the hinge portion;

wherein a lower end of the vertical portion of the upper bell crank and an upper end of the vertical portion of the lower bell crank is pivotally mounted on a movable hinge shaft to which the actuating force of the actuator is applied.

9. A suspension system in accordance with claim 8, wherein each length of the vertical portions of the upper and lower bell cranks is greater than each length of the horizontal portions of the upper and lower bell cranks.

10. A suspension system for a vehicle, comprising:

a wheel carrier for rotatably supporting a wheel;

an upper control link having a first end coupled to an upper end of the wheel carrier and a second end mountable in proximity to the vehicle body;

a lower control link having a first end coupled to a lower end of the wheel carrier and a second end mountable in proximity to the vehicle body;

a reciprocating hydraulic actuator disposed such that its reciprocating motion becomes perpendicular to a vertical direction of the vehicle body;

an electronic control part for controlling an operation of the reciprocating hydraulic actuator in accordance wit the driving conditions of the vehicle;

an upper bell crank comprising a hinge portion pivotally coupled on an upper stationary hinge shaft supported by an upper bracket fixedly mounted on a vehicle body, a horizontal portion extending from the hinge portion toward the wheel carrier and to which the second end of the upper control link is pivotally coupled, and a vertical portion extending downward from the hinge portion;

a lower bell crank comprising a hinge portion pivotally coupled on an upper stationary hinge shaft supported by the lower bracket, a horizontal portion extending from the hinge portion toward the wheel carrier and to which the second end of the lower control link is pivotally coupled, and a vertical portion extending upward from the hinge portion; and a lower end of the vertical portions of the upper bell crank and an upper end of the vertical portion of the lower bell crank being pivotally mounted on a movable hinge shaft to which the actuating force of the actuator is applied.

11. A suspension system in accordance with claim 10 wherein each length of the vertical portions of the upper and lower bell cranks is greater than each length of the horizontal portions of the upper and lower bell cranks.

* * * * *